Figure 1:
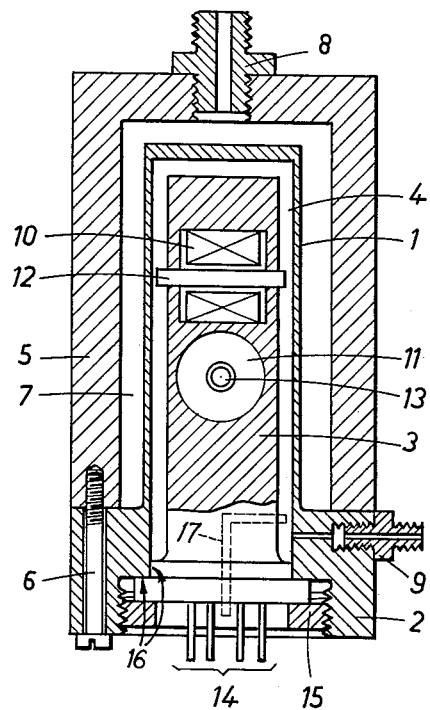

Feb. 20, 1962 G. ARVIDSON 3,021,711
DEVICE FOR MEASURING PRESSURE OR DIFFERENCE
OF PRESSURE IN FLUIDS
Filed Feb. 10, 1958 2 Sheets-Sheet 1

Inventor
Gunnar Arvidson
by Sommers + Young
Attorneys

United States Patent Office 3,021,711
Patented Feb. 20, 1962

3,021,711
DEVICE FOR MEASURING PRESSURE OR DIFFERENCE OF PRESSURE IN FLUIDS
Gunnar Arvidson, Trollhattan, Sweden, assignor to Svenska Flygmotor Aktiebolaget, Trollhattan, Sweden
Filed Feb. 10, 1958, Ser. No. 714,217
Claims priority, application Sweden May 10, 1957
2 Claims. (Cl. 73—398)

The present invention relates to a device for measuring pressure or difference of pressure in gaseous or liquid media.

The invention is characterized by the provision of a hollow body capable of being set in vibration by feeding energy thereto, the respective medium or media hereinafter referred to as "fluid" being supplied to the internal and/or external surface of said hollow body so as thereby to change the natural frequency of the vibrating body with a view to allowing determination of the pressure or the difference of pressure in the fluid.

It is of great value in many cases to be able to translate a measured quantity into a signal—as for instance, an electric signal—the frequency of which depends on the measured value. This is true especially in such cases where the signal is to be transmitted over long distances by wire or radio link, since, of course, the frequency of the signal is not changed by the transmission. The same comment applies if the signal is to be recorded by photographic or magnetic means to be then reproduced by playing the record. In this case the measured value will remain unchanged, if the frequency be measured by means of a time normal recorded and reproduced together with the measured signal. A further advantage as obtained by this type of transducer is that it allows translation in a simple way and with a high degree of exactness of the measured values from analog form to digital form by means of pulse counting.

Among already known pressure measuring instruments there are several types which yield an output signal the frequency of which is dependent on the pressure. Examples of such instruments are transducers having an electric oscillation circuit (including a variable inductance or capacitance) and transducers in which a diaphragm subjected to the pressure acts on a string so as to change the tension and natural frequency thereof. In all these cases the pressure is first transformed into a displacement (as for instance, of a diaphragm) which is then allowed to act on the sensing member (as for instance, a coil, a condenser or a string). This transformation causes sources of error which may be reduced only by means of a rather complicated structure and a very exact manufacture.

By allowing according to the invention the pressure or the difference of pressure directly to act on a mechanical vibratory system so as to change the natural frequency thereof, a very high degree of exactness in performing the measuring operation may be secured.

Figure 2:
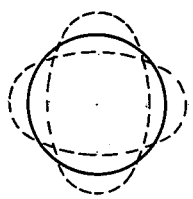
Figure 3:
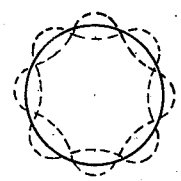
Figure 4:
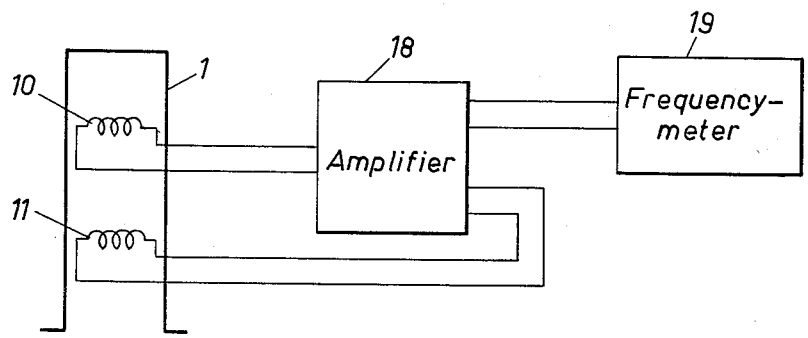

In the accompanying drawing an embodiment of the invention is illustrated. FIG. 1 is a longitudinal section of the device. FIGS. 2 and 3 show different forms of vibration of the pressure responsive vibratory body of the device. FIG. 4 is a diagrammatic illustration of a modification.

In the embodiment shown the vibratory body comprises a cylinder 1 having a thin mantle wall of magnetic material which is closed at one end. At its open end the cylinder is formed with a thick annular flange 2. Placed inside the cylinder 1 is a solid coil frame 3. The bottom portion of this frame fits snugly in the flange 2 and is locked in its engagement therewith by means of a threaded ring 15 screwed into the flange 2. Around the frame 3 the cylinder 1 forms a closed space 4.

Externally, the flange 2 forms a seat for receiving an outer housing 5 which is held in place by screws 6 extending through borings in the flange. Around the cylinder the outer housing forms a closed space 7. At its top the housing is provided with a connecting branch 8 for admitting a pressure medium to said space 7. Another connecting branch 9 is provided in flange 2 in communication with a channel formed therein for admitting a pressure medium to the space 4 between the cylinder 1 and the coil frame 3.

Mounted in coil frame 3 are two coils 10 and 11. Coil 10 is provided with a soft iron core 12 and coil 11 is provided with a permanently magnetic core 13. Both coils are in the example shown oriented in directions at right angles to each other.

Electrical conductors leading to the coils are introduced through the coil frame, as indicated at 14.

By supplying current to the coils the cylinder mantle 1 may be set into vibration according to one of the natural vibration modes, characterized by circular nodes at the ends of the cylinder and a plurality of straight nodes along the cylinder. FIGS. 2 and 3 illustrate two such vibration modes, the heavy lines indicating the position of balance of mantle 1 and the dotted lines indicating the end positions. Said vibrations may be tested because of their inducing of an electromotive force in coil 11.

To measure an absolute pressure, the pressure medium under consideration is admitted through any of the connecting branches 8, 9, while through the other connecting branch a medium of a known pressure is admitted. In measuring a difference of pressure each pressure media is introduced through an individual one of the connecting branches. It is thus seen that in both cases one pressure is allowed to act on the internal surface of the cylinder wall 1 and the other on the external surface of said wall.

During the vibration of the cylinder wall the cross section area of the cylinder varies and, if there is a difference of pressure between the internal and external surfaces of the cylinder wall, said wall will thus yield a work corresponding to the difference of pressure. As a result, the difference of pressure influences the natural frequency of the cylinder.

Let $f$ designate the natural frequency, $A$ the amplitude at an arbitrarily chosen point, and $\Delta p$ the difference between the pressures prevailing inside and outside the cylinder, then the hereinbelow stated expressions will be obtained in respect of the kinetic energy and the potential energy, respectively—under the assumption that the vibration form is independent of the difference of pressure. $K_1$, $K_2$ and $K_3$ designate constants depending on the material and the dimensions of the cylinder as well as on the vibration form.

The kinetic energy in the position of balance:

$$E_R = K_1 A^2 f^2$$

The potential energy in the end position due to elastic deformation:

$$E_E = K_2 A^2$$

The potential energy in the end positons due to yielded work corresponding to the difference of pressure:

$$E_p = K_3 A^2 \Delta p$$

At resonance:

$$E_R = E_E + E_p$$

and consequently:

$$K_1 A^2 f^2 = K_2 A^2 + K_3 A^2 \Delta p$$

$$f = \sqrt{\frac{K_2}{K_1}} \cdot \sqrt{1 + \frac{K_3}{K_2} \Delta p}$$

The frequency will thus be dependent on $\Delta p$. A corresponding effect will be obtained also in respect of other geometric shapes of the hollow body.

In the embodiment shown in FIG. 1 the measuring of the natural frequency of the cylinder is effected as follows: Coil 10 is fed with a continuous current and an alternating current superposed thereon. If the frequency of this alternating current is equal to the natural frequency of the cylinder, the cylinder will be set into vibration. As a result, an alternating voltage of the same frequency will be induced in coil 11. The natural frequency may be determined by adjusting the frequency of the input current so that the voltage induced in coil 11 becomes a maximum.

The natural frequency may also be determined by coupling the two coils together via an amplifier so as to produce a self-vibrating system (similarly as in a tuning fork oscillator). The frequency of the vibration will be equal to the natural frequency of the cylinder and may thus be measured by deriving a signal from the amplifier and transmitting it to a frequency meter. This arrangement is illustrated in FIG. 4 in which the numerals 10 and 11 designate the two coils, 18 is the amplifier and 19 is the frequency meter.

In the embodiment shown in FIG. 1 both coils are oriented at right angles to each other. In this case the electromagnetic coupling between the coils will be very small (theoretically=0) so that an input current at coil 10 will yield a very small output voltage at coil 11 when the cylinder is not vibrating. By this means the construction of the amplifier will be considerably facilitated.

The natural frequency of the vibrating body may, of course, be measured in other ways than that above described.

The measuring instrument is in the example shown not quite independent of the temperature. The frequency sinks slightly with increasing temperature owing to the decrease of the modulus of elasticity of the vibrating body. This effect may be reduced in respect of instruments for measuring absolute pressure by applying the unknown pressure to the external surface of the vibratory body (space 7), while hermetically closing the internal (space 4) of said body. The pressure of the fluid enclosed in the hollow body will, as a result, increase with increasing temperature resulting in an increase of frequency counteracting the influence of the reduction of elasticity. The increase of pressure of the fluid enclosed will be proportional to the pressure level and by adjusting said level to an appropriate value the best temperature compensation possible may be obtained. The hermetic sealing of space 4 may be accomplished by cementing or soldering the members 1 and 3 to each other at 16 and making the base of member 3 gas-tight.

The adjustment of the internal pressure level may be effected via a capillary pipe, as indicated at 17, which is sealed while said pressure is still applied. In this case the connector 9 and the corresponding bore in member 2 may be dispensed with.

I claim:

1. A device for measuring pressure or difference in pressure in fluid comprising in combination, a hollow body in the shape of a circular cylinder of magnetic material closed at one end, an electromagnet energized by alternating current symmetrically positioned inside said cylinder with its axis at right angles to the axis of the cylinder for imparting to said cylinder a vibration in one of the natural vibrating modes characterized by circular nodes at the ends of the cylinder and a plurality of straight nodes along the cylinder the cylinder having in this vibration node a natural frequency which may be influenced by the difference of pressures inside and outside of the cylinder, another electromagnet also symmetrically positioned inside the cylinder with its axis at right angles to the longitudinal axis of the cylinder for testing the vibrations thereof, means for supplying the medium or media under consideration to said body on the internal or external surface thereof, the said testing electromagnet being connected to the input of an amplifier having two outputs, one of which for delivering the driving current to the vibration generating electromagnet and the other being connected to a frequency measuring means.

2. In a device as claimed in claim 1, and means hermetically closing the cavity of the vibratory cylinder for allowing subjection of the inside of the cylinder to a pressure of any desired value.

References Cited in the file of this patent

UNITED STATES PATENTS

| 2,358,374 | Ashcraft | Sept. 19, 1944 |
| 2,466,809 | Hobbs | Apr. 12, 1949 |
| 2,635,462 | Poole et al. | Apr. 21, 1953 |
| 2,887,882 | Richter | May 26, 1959 |
| 2,896,449 | Turner | July 28, 1959 |
| 2,911,826 | Kritz | Nov. 10, 1959 |

FOREIGN PATENTS

| 786,113 | Great Britain | Nov. 13, 1957 |